(12) United States Patent
Alam et al.

(10) Patent No.: US 7,946,593 B2
(45) Date of Patent: May 24, 2011

(54) SEALED SYSTEMS AND METHODS FOR SEALING A SHAFT

(75) Inventors: Mohsiul Alam, Chandler, AZ (US); Jack Moy, Chandler, AZ (US); Thomas P. Swadener, Tempe, AZ (US); James E. Franks, Desert Hills, AZ (US)

(73) Assignee: Honeywell International Inc., Morristown, NJ (US)

( * ) Notice: Subject to any disclaimer, the term of this patent is extended or adjusted under 35 U.S.C. 154(b) by 931 days.

(21) Appl. No.: 11/742,163

(22) Filed: Apr. 30, 2007

(65) Prior Publication Data
US 2008/0267767 A1 Oct. 30, 2008

(51) Int. Cl.
*F16J 15/02* (2006.01)
*F16L 55/10* (2006.01)
*F01D 11/00* (2006.01)

(52) U.S. Cl. ........ 277/630; 277/637; 277/650; 277/644; 415/111; 138/89

(58) Field of Classification Search .................. 277/315, 277/375, 406, 625, 630, 637, 642, 645, 650, 277/607, 644; 415/110, 111; 138/89, 94
See application file for complete search history.

(56) References Cited

U.S. PATENT DOCUMENTS

| | | | |
|---|---|---|---|
| 2,542,955 A * | 2/1951 | Young et al. | 72/53 |
| 3,420,274 A | 1/1969 | Buttery et al. | |
| 4,021,907 A | 5/1977 | Zondag | |
| 4,717,608 A | 1/1988 | Meltsch | |
| 5,944,057 A | 8/1999 | Pierce | |
| 6,270,440 B1 * | 8/2001 | Adeyemi et al. | 475/230 |
| 6,428,017 B1 | 8/2002 | Galonska et al. | |
| 6,508,520 B2 * | 1/2003 | Sampson et al. | 303/113.1 |
| 7,070,186 B2 | 7/2006 | Creek | |
| 2006/0127694 A1 * | 6/2006 | Hazel et al. | 428/652 |
| 2008/0222853 A1 * | 9/2008 | Zavattieri et al. | 24/20 R |

* cited by examiner

*Primary Examiner* — Alison K Pickard
(74) *Attorney, Agent, or Firm* — Ingrassia Fisher & Lorenz, P.C.

(57) ABSTRACT

A seal is provided for sealing a hollow shaft, where the hollow shaft has an inner surface that may be uneven due to shot peening. The seal includes an axially extending ring section having a first end, a second end, an inner surface, and a disk section disposed substantially perpendicular to the ring section inner surface between the ring section first and second ends. The seal conforms to the shaft inner surface to stop oil leakage.

7 Claims, 3 Drawing Sheets

SEALED SYSTEMS AND METHODS FOR SEALING A SHAFT

TECHNICAL FIELD

The inventive subject matter relates to seals and, more particularly, to seals, sealed systems, and methods for sealing a shaft.

BACKGROUND

Gas turbine engines are used as the primary power source for many types of aircraft. Most turbine engines include rotating components such as a fan, a compressor, and a turbine. The rotating components may be clamped together either by a tieshaft or bolted flange joints to form a rotor group. To support the rotor group, two or more bearing assemblies may be mounted thereto. Specifically, the bearing assemblies may include an inner race component that is disposed on a shaft of the rotor group, an outer race component spaced apart from the inner race component, and a bearing or other roller element disposed therebetween.

The bearing assemblies are typically lubricated with a liquid, such as oil. In this regard, the bearing assemblies are mounted adjacent openings formed in the shaft that communicate with passages that receive the oil from an oil source. To maintain the oil within a certain portion of the shaft, the interior of the shaft is typically sealed with a plug. In one example, the plug is a disk that has an O-ring disposed on its outer periphery. The disk blocks the oil flow, while the O-ring seals against the inner surface of the shaft. In another example, the plug is a disk having a tapered flange extending axially therefrom. This type of plug is typically press fit into the shaft such that the disk outer periphery and the tapered flange contact and seal against the shaft inner surface.

Although conventional plugs operate adequately, they suffer from drawbacks in some circumstances. For example, plugs including O-rings may not suitably seal the shaft, if the rotor group is exposed to high temperatures (e.g., temperatures in excess of 230° C.). In these cases, a tapered flange plug may be employed; however, if the shaft inner surface does not have a substantially smooth surface finish, such as when the shaft has been shot-peened to improve shaft fatigue strength, oil may leak between the plug outer surface and the shaft inner surface.

Accordingly, there is a desire for improved seals and methods for sealing a shaft. It would be desirable for the seal to be capable of sealing the shaft with minimal leakage, even if the shaft is exposed to high temperatures. Additionally, it would be desirable for the seal to be capable of sealing a shaft having an inner surface that may not have a substantially smooth surface finish. Moreover, it would be desirable for the seal to be capable of replacing existing seals.

BRIEF SUMMARY

The inventive subject matter provides seal and methods for sealing a shaft, such as a high temperature shaft with rough or shot-peened sealing surfaces.

In one embodiment, and by way of example only, a seal is provided for sealing a hollow shaft, where the hollow shaft has an inner surface. The seal includes an axially extending ring section having a first end, a second end, an inner surface, and a disk section disposed substantially perpendicular to the ring section inner surface between the ring section first and second ends.

In another embodiment, and by way of example only, a seal system is provided. The system includes a hollow shaft having an inner surface and a seal disposed within the hollow shaft. The seal includes an axially extending ring section having a first end, a second end, and an inner surface and a disk disposed between the ring section first and second ends substantially perpendicular to the ring section inner surface.

In still another embodiment, and by way of example only, a method is provided of sealing a hollow shaft having an inner surface. The method includes inserting a seal into the hollow shaft, the seal comprising an axially extending ring section having a first end, a second end, and an inner surface, and a disk disposed between the ring section first and second ends substantially perpendicular to the ring section inner surface, and contacting the ring outer surface with the hollow shaft inner surface.

Other independent features and advantages of the preferred seals and methods will become apparent from the following detailed description, taken in conjunction with the accompanying drawings which illustrate, by way of example, the principles of the inventive subject matter.

DETAILED DESCRIPTION OF A PREFERRED EMBODIMENT

The following detailed description of the inventive subject matter is merely exemplary in nature and is not intended to limit the inventive subject matter or the application and uses of the inventive subject matter. Furthermore, there is no intention to be bound by any theory presented in the preceding background of the inventive subject matter or the following detailed description of the inventive subject matter.

Figure 1:
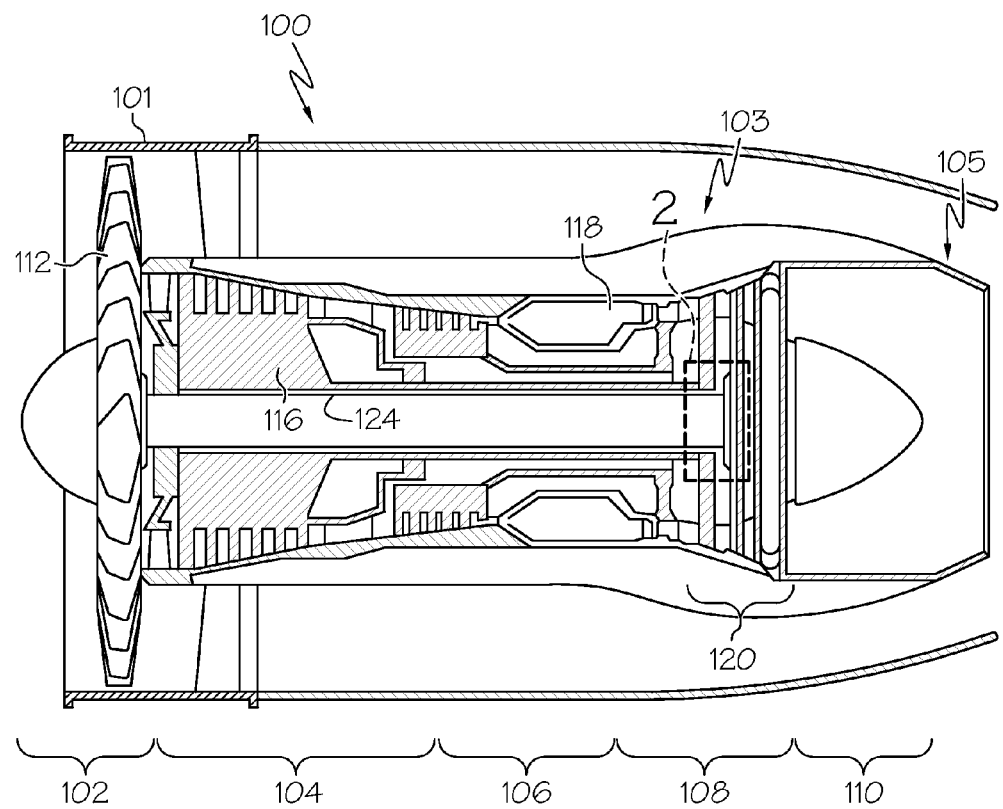
FIG. 1 is a simplified, cross-sectional view of a gas turbine engine, according to an embodiment.

FIG. 1 is a simplified, cross-sectional view of a gas turbine engine 100, according to an embodiment. The engine 100 may be disposed in an engine case 101 and may include a fan section 102, a compressor section 104, a combustion section 106, a turbine section 108, and an exhaust section 110. The fan section 102 may include a fan 112, which draws air into the fan section 102 and accelerates it. A fraction of the accelerated air exhausted from the fan 112 is directed through a bypass section 103 to provide a forward thrust. The remaining fraction of air exhausted from the fan 112 is directed into the compressor section 104.

The compressor section 104 may include series of compressors 116, which raise the pressure of the air directed into it from the fan 112. The compressors 116 may direct the compressed air into the combustion section 106. In the combustion section 106, which may include an annular combustor 118, the high pressure air is mixed with fuel and combusted. The combusted air is then directed into the turbine section 108.

The turbine section 108 may include a series of turbines 120, which may be disposed in axial flow series. The combusted air from the combustion section 106 expands through the turbines 120, causing them to rotate. The air is then exhausted through a propulsion nozzle 105 disposed in the exhaust section 110, providing additional forward thrust. In an embodiment, the turbines 120 rotate to thereby drive equipment in the engine 100, such as the compressor 116, via concentrically disposed shafts 124.

Figure 2:
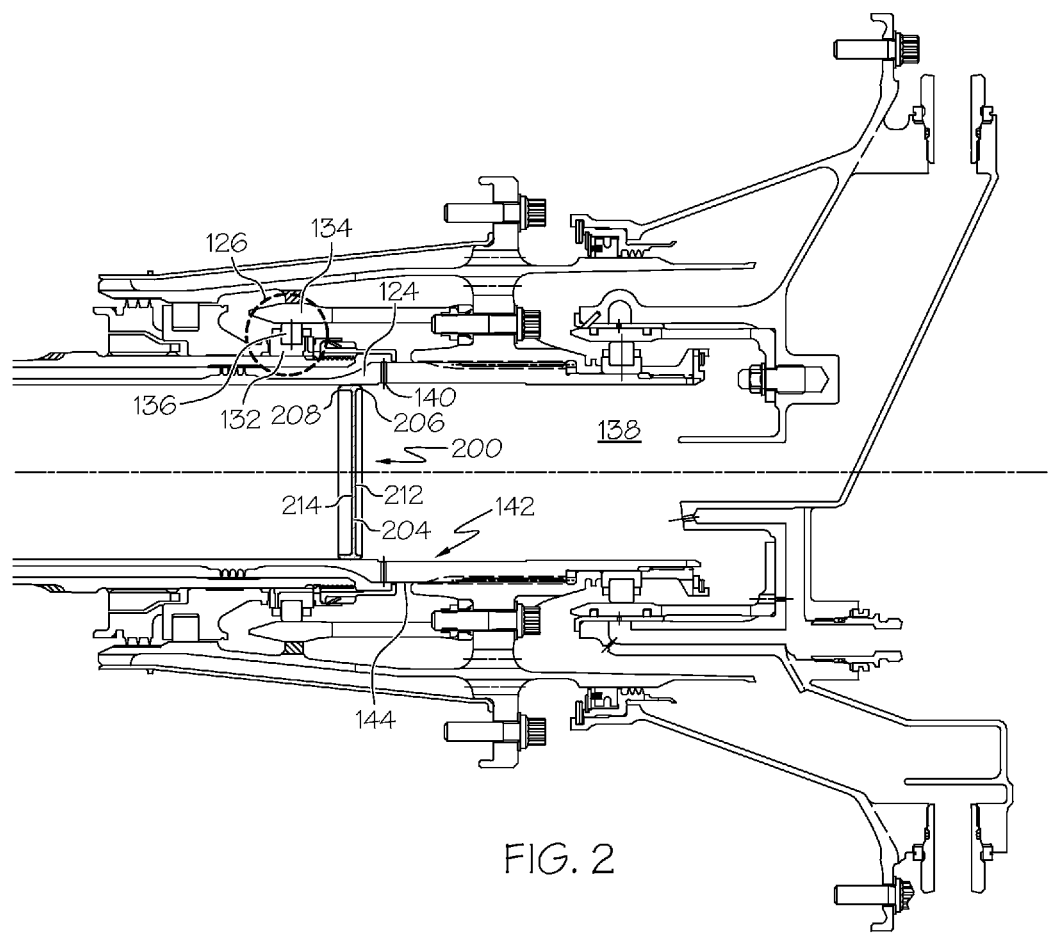
FIG. 2 is a close-up view of a portion of the engine indicated by dotted line 2 in FIG. 1, according to an embodiment.

Turning now to FIG. 2, a close-up view is provided of an area of the engine 100 indicated by dotted line 2 including the shaft 124 shown in FIG. 1, according to an embodiment. The shaft 124 is supported in position within the engine 100 via two or more bearing assemblies 126. The bearing assembly 126 includes an inner race component 132, an outer race component 134, and a conventional rolling element 136, such as a ball or roller, disposed therebetween. The inner race component 132 is mounted to the shaft 124.

To ensure the bearing assembly 126 operates properly, the rolling element 136 and surfaces against which the elements contact may be kept lubricated. In this regard, a lubricant may flow through a passage 138 and openings 140 formed through the shaft 124. The passage 138 is defined by the inner surface 142 of the shaft 124 and extends along at least a portion of the length thereof. The openings 140 extend between the inner surface 142 and outer surface 144 of the shaft 124. Although two openings 140 are shown, fewer or more may alternatively be included.

In an embodiment, lubricant flow is restricted to a certain portion of the passage 138. Thus, a seal 200 is included to form a substantially leak-tight seal with the shaft inner surface 142. To ensure that the seal 200 is capable of sealing against uneven shaft surfaces, such as those that have been shot-peened, the seal 200 is made of a material having a Rockwell hardness value of 42 Rc, in an embodiment. Examples of suitable materials include nickel base superalloys and iron alloys, to name a few.

Figure 3:
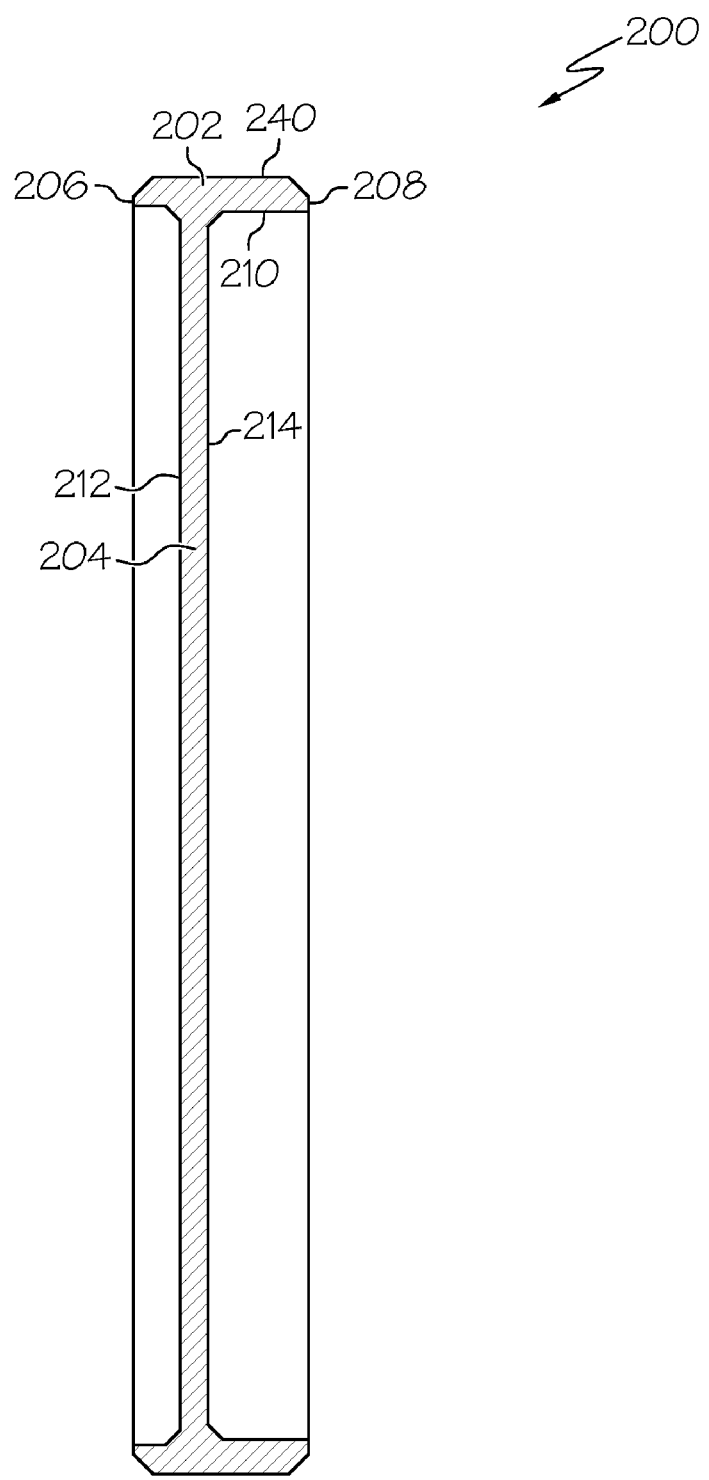
FIG. 3 is a cross-sectional side view of a seal, according to an embodiment.

With additional reference to FIG. 3, a cross-sectional view of the seal 200 is provided. The seal 200 is made up of a ring section 202 and a disk section 204, which may be attached or integrally formed together. The ring section 202 extends axially relative to the shaft 124 when disposed therein and includes a first end 206, a second end 208, and an inner surface 210. In an embodiment, the seal 200 may be configured to be interference fit into the shaft 124 and thus, the ring section 202 may have an outer diameter that is greater than the inner diameter of the shaft 124. In another embodiment, the ring section 202 is configured such that its outer diameter remains substantially uniform along its length.

The disk section 204 is disposed between the ring section first and second ends 206, 208 and is positioned such that it is substantially perpendicular to the ring inner surface 210. Such a configuration ensures that the outer surface 240 of the ring section 202 forms a substantially leak-tight seal with the shaft inner surface 142, when the seal 200 is fit into the shaft 124. Specifically, the disk section 204 along with its ring section 202 provides a stiff interface with the shaft inner surface 142, thereby causing the shaft inner surface 142 to conform to the shape of the ring section outer surface 240. Moreover, during operation when the shaft 124 rotates, centrifugal forces exerted on the seal 200 may cause the disk section 204 and the ring section 202 to grow to thereby allow the seal 200 to provide an improved sealing interface with the shaft inner surface 142, as compared to conventional seals.

The disk section 204 has a first side 212 and a second side 214. In one embodiment, each of the sides 212, 214 may be substantially flat. In another embodiment, the inner diameter of the ring section 202 adjacent the disk section first side 212 may be less than the inner diameter of the ring section 202 adjacent the disk section second side 214. In another embodiment, the disk 202 is positioned such that the disk section first side 212 is closer in proximity to the ring section first end 206 than to the second end 208. The location of the disk section 204 relative to the ring section 202 may provide maximum sealing with the shaft inner surface 142.

Embodiments of the inventive subject matter may be used in a number of different types of sealed systems having a hollow shaft. These systems include, but are not limited to gas turbine engines that include at least a shaft 124 and a bearing assembly 126 mounted thereto.

To seal the shaft 124, the seal 200 is inserted into the shaft 124. In an embodiment, the seal 200 may include an axially extending ring section 202 having a first end 206, a second end 208, an inner surface 210, and an outer surface 240, and a disk section 204 disposed between the ring section first and second ends 206, 208 substantially perpendicular to the ring section inner surface 210. The ring outer surface 240 is then contacted with the hollow shaft inner surface 142. As mentioned above, the seal 200 may be interference fit into the shaft 124, specifically, where the seal 200 is forced into the hollow portion of the shaft 124. In this regard, the seal 200 may be subjected to temperatures that are below the freezing point of the seal material prior to being inserted. Alternatively, the shaft 124 may be heated prior to the seal 200 being inserted. The seal may be disposed adjacent an opening 140 formed in the hollow shaft 124. In another embodiment, a portion of the seal ring section 202 disposed adjacent the shaft opening 140 has an inner diameter that is greater than another portion of the ring section that is not adjacent the shaft opening 140 to provide proper installation of an asymmetrical seal 200.

Seals, sealing systems, and methods for sealing a shaft have now been provided. When the seal is interference fit in the shaft, the ring section of the seal may provide an extended axial sealing surface with the shaft inner surface. Additionally, because the seal may be made of a material having a hardness of at least 42 Rc, it may be stiffer than conventional shaft and thus, may be capable of sealing the shaft with minimal leakage. Moreover, the seal may be capable of sealing the shaft, even if the shaft is exposed to high temperatures (e.g., temperatures in excess of 230° C.). The seal may also be capable of sealing a shaft having an inner surface that may not have a substantially smooth surface finish, and may be used to replace existing seals.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:
1. A sealed system comprising:
a hollow shaft having an outer surface, an inner surface, and an opening, the inner surface having a shot peened surface finish and defining a passage, and the opening extending between the outer surface and the inner surface;
a bearing assembly mounted to the hollow shaft to receive lubricant from the opening of the hollow shaft; and a seal disposed within the passage of the hollow shaft to restrict lubricant flow to a portion of the passage in communication with the bearing assembly, the seal comprising:
  an axially extending ring section having a first end, a second end, and an inner surface, the ring section having a length from the first end to the second end and a substantially uniform outer diameter along an entirety of the length of the ring section; and
  a disk disposed between the ring section first and second ends substantially perpendicular to the ring section inner surface, the disk section disposed closer in proximity to the ring section first end than to the ring section second end and having a first side and a second side, the disk section first side disposed adjacent the opening in the hollow shaft and the ring section first end,
  wherein a portion of the ring section adjacent the disk first side has an inner diameter that is greater than an inner diameter of a portion of the ring section adjacent the disk second side.

2. The system of claim 1, wherein the seal is interference fit into the hollow shaft.

3. The system of claim 1, wherein the seal comprises a nickel based superalloy.

4. The system of claim 1, wherein the ring section and the disk section are integrally formed.

5. A method of sealing a hollow shaft of an engine system, the method comprising:
  inserting a seal into the hollow shaft, the hollow shaft having an outer surface, an inner surface, an opening, and a bearing assembly mounted to the hollow shaft, the inner surface having a shot peened surface finish and defining a passage, and the opening extending between the outer surface and the inner surface, the bearing assembly mounted to the shaft to receive lubricant from the opening of the hollow shaft, the seal comprising an axially extending ring section and a disk, the ring section having a first end, a second end, and an inner surface, the ring section having a length from the first end to the second end and a substantially uniform outer diameter along an entirety of the length of the ring section, and a the disk disposed between the ring section first and second ends substantially perpendicular to the ring section inner surface, the disk section disposed closer in proximity to the ring section first end than to the ring section second end and having a first side and a second side, the disk section first side disposed adjacent the opening and the ring section first end; and
  contacting the ring outer surface with the hollow shaft inner surface to restrict lubricant flow to a portion of the passage of the hollow shaft in communication with the bearing assembly,
  wherein a portion of the ring section adjacent the disk first side has an inner diameter that is greater than an inner diameter of a portion of the ring section adjacent the disk second side.

6. The method of claim 5, wherein the ring section outer diameter is greater than an inner diameter of the hollow shaft, and the method further comprises the step of subjecting the seal to a temperature that is substantially equal to or below a freezing point of a material of the seal, before the step of inserting the seal.

7. The method of claim 5, wherein the ring section outer diameter is greater than an inner diameter of the hollow shaft, and the method further comprises the step of heating the shaft, before the step of inserting the seal.

* * * * *